(12) United States Patent
Koshizen et al.

(10) Patent No.: US 9,171,463 B2
(45) Date of Patent: Oct. 27, 2015

(54) CONGESTION ESTIMATION DEVICE

(75) Inventors: Takamasa Koshizen, Wako (JP); Katsuhiro Nishinari, Tokyo (JP)

(73) Assignees: HONDA MOTOR CO., LTD., Tokyo (JP); THE UNIVERISTY OF TOKYO, Tokyo (JP)

( * ) Notice: Subject to any disclaimer, the term of this patent is extended or adjusted under 35 U.S.C. 154(b) by 121 days.

(21) Appl. No.: 13/807,250

(22) PCT Filed: Jun. 2, 2011

(86) PCT No.: PCT/JP2011/062711
§ 371 (c)(1),
(2), (4) Date: Dec. 27, 2012

(87) PCT Pub. No.: WO2012/002099
PCT Pub. Date: Jan. 5, 2012

(65) Prior Publication Data
US 2013/0103296 A1    Apr. 25, 2013

(30) Foreign Application Priority Data

Jun. 29, 2010    (JP) ................................. 2010-147571

(51) Int. Cl.
*G08G 1/16*    (2006.01)
*G08G 1/052*    (2006.01)
(Continued)

(52) U.S. Cl.
CPC ............... *G08G 1/052* (2013.01); *B60K 37/02* (2013.01); *G01C 21/3691* (2013.01); *G08G 1/0112* (2013.01); *G08G 1/0133* (2013.01);
(Continued)

(58) Field of Classification Search
CPC ......... G08G 1/16; G08G 1/166; G08G 1/052; G01S 19/42; G01C 21/34
USPC ........................................................ 701/120
See application file for complete search history.

(56) References Cited

U.S. PATENT DOCUMENTS 5,436,835 A * 7/1995 Emry .............................. 701/70
5,822,712 A * 10/1998 Olsson .......................... 701/117
(Continued)

FOREIGN PATENT DOCUMENTS

CN    1952992 A    4/2007
CN    101490730 A    7/2009
(Continued)

OTHER PUBLICATIONS

Variance and standard deviation (grouped data), mathcentre, Jun. 17, 2003.*
(Continued)

*Primary Examiner* — Calvin Cheung
*Assistant Examiner* — Martin Weeks
(74) *Attorney, Agent, or Firm* — Arent Fox LLP

(57) ABSTRACT

Disclosed is a congestion estimation device including a speed detection unit configured to detect a speed of a host vehicle and then outputting a speed detection result, an inter-vehicle distance detection unit configured to detect an inter-vehicle distance between the host vehicle and other vehicle and then outputting an inter-vehicle distance detection result, a correlation calculation unit configured to calculate a correlation based on the speed detection result and the inter-vehicle distance detection result and then outputting a correlation calculation result, and a display unit configured to display the correlation calculation result or information relating to the correlation calculation result.

6 Claims, 4 Drawing Sheets

(51) Int. Cl.
    *B60K 37/02*  (2006.01)
    *G01C 21/36*  (2006.01)
    *G08G 1/01*  (2006.01)

(52) U.S. Cl.
    CPC ....... *G08G 1/166* (2013.01); *B60K 2350/1064* (2013.01); *Y02T 10/84* (2013.01)

(56) References Cited

U.S. PATENT DOCUMENTS

| | | | |
|---|---|---|---|
| 6,128,571 A * | 10/2000 | Ito et al. | 701/426 |
| 2006/0204039 A1* | 9/2006 | Maemura et al. | 382/104 |
| 2011/0106416 A1* | 5/2011 | Scofield et al. | 701/119 |
| 2011/0190972 A1* | 8/2011 | Timmons et al. | 701/29 |

FOREIGN PATENT DOCUMENTS

| | | |
|---|---|---|
| JP | 2000-172994 A | 6/2000 |
| JP | 2008-18872 A | 1/2008 |
| JP | 2009-286274 A | 12/2009 |

OTHER PUBLICATIONS

International Search report, PCT/JP2011/062711 dated Aug. 2, 2011.
Search Report issued in Japanese Patent Application No. 201180031766.0 dated Jul. 2, 2014.
Chinese Office Action issued in Chinese Patent Application No. 201180031766.0 dated Jul. 2, 2014 (with translation of Search Report).

* cited by examiner

CONGESTION ESTIMATION DEVICE

CROSS-REFERENCE TO RELATED APPLICATION

This application is a National Stage entry of International Application No. PCT/JP2011/062711 filed Jun. 2, 2011, which claims priority to Japanese Patent Application Nos. 2010-147571 filed Jun. 29, 2010, the disclosure of the prior applications are hereby incorporated in their entirety by reference.

TECHNICAL FIELD

The present invention relates to a congestion estimation device.

Priority is claimed on Japanese Patent Application No. 2010-147571, filed Jun. 29, 2010, the content of which is incorporated herein by reference.

BACKGROUND ART

In the related art, for example, there has been known an apparatus in which other vehicle is detected by a millimeter wave radar device, the vehicle density between the other vehicle present within a predetermined distance from a host vehicle and the host vehicle is calculated and, further, whether the traveling state of the host vehicle is a cause of traffic congestion is determined by using critical density in accordance with the speed of the host vehicle to notify a driver of the determination result (for example, refer to patent document 1).

DOCUMENTS OF THE PRIOR ART

Patent Documents

[Patent document 1] Japanese Unexamined Patent Application, First Publication No. 2009-286274

DISCLOSURE OF INVENTION

Problems to be Solved by the Invention

However, according to the apparatus in the related art, since a determination process using vehicle density is simple, there is a problem that it is difficult to improve the accuracy of traffic congestion estimation.

The present invention has been made in consideration of such a problem, and an object of the present invention is to provide a congestion estimation device which is capable of properly improving the estimation accuracy of traffic congestion.

Means for Solving the Problem

In order to solve the above problem, the present invention employed the following.

(1) According to an aspect of the present invention, there is provided a congestion estimation device including a speed detection unit configured to detect a, speed of a host vehicle and then outputting a detection result, an inter-vehicle distance detection unit configured to detect an inter-vehicle distance between the host vehicle and other vehicle and then outputting a detection result, a correlation calculation unit configured to calculate a correlation based on the speed detection result and the inter-vehicle distance detection result and then outputting a calculation result, and a display unit configured to display the correlation calculation result or information relating to the correlation calculation result.

(2) According to another aspect of the present invention, there is provided a congestion estimation device including a speed detection unit configured to detect a speed of a host vehicle and then outputting a detection result, an inter-vehicle distance detection unit configured to detect an inter-vehicle distance between the host vehicle and other vehicle and then outputting a detection result, a correlation calculation unit configured to calculate a correlation based on the speed detection result and the inter-vehicle distance detection result and then outputting a calculation result, and a congestion estimation unit configured to estimate an occurrence of traffic congestion based on the correlation calculation result.

(3) According to still another aspect of the present invention, there is provided a congestion estimation device including a speed detection unit configured to detect the speed of a host vehicle and then outputting a detection result, an inter-vehicle distance detection unit configured to detect an inter-vehicle distance between the host vehicle and other vehicle and then outputting a detection result, a simple regression line calculation unit configured to calculate a simple regression line based on the speed detection result and the inter-vehicle distance detection result and then outputting a calculation result, and a display unit configured to display the calculation result of the simple regression line or information relating to the calculation result of the simple regression line.

(4) The congestion estimation device according to (3) may further include a standard deviation calculation unit configured to calculate a standard deviation of parameters of the simple regression line and then outputting a calculation result, and the display unit may display the calculation result of the standard deviation or information relating to the calculation result of the standard deviation.

(5) According to still another aspect of the present invention, there is provided a congestion estimation device including a speed detection unit configured to detect a speed of a host vehicle and then outputting a detection result, an inter-vehicle distance detection unit configured to detect the inter-vehicle distance between the host vehicle and other vehicle and then outputting a detection result, a simple regression line calculation unit configured to calculate a simple regression line based on the speed detection result and the inter-vehicle distance detection result and then outputting a calculation result, and a congestion estimation unit configured to estimate an occurrence of traffic congestion based on the calculation result of the simple regression line.

(6) The congestion estimation device according to (5) may further include a standard deviation calculation unit configured to calculate a standard deviation of parameters of the simple regression line and then outputting a calculation result, and the congestion estimation unit may estimate the occurrence of traffic congestion based on the calculation result of the simple regression line and the calculation result of the standard deviation.

Effects of Invention

According to the aspect of (1), a correlation of the detection result of the speed and the detection result of the inter-vehicle distance or the information relating to the correlation is displayed so that a driver can accurately estimate the occurrence of traffic congestion.

According to the aspect of (2), the occurrence of traffic congestion can be accurately estimated based on a correlation of the detection result of the speed and the detection result of the inter-vehicle distance.

According to the aspect of (3), the simple regression line of the detection result of the speed and the detection result of the inter-vehicle distance or the information relating to the simple regression line is displayed so that that a driver can accurately estimate the occurrence of traffic congestion.

According to the aspect of (4), the standard deviation of the parameters in the simple regression line of the detection result of the speed and the detection result of the inter-vehicle distance or the information relating to the standard deviation is displayed so that a driver can accurately estimate the occurrence of traffic congestion, in addition to the effect in (3).

According to the aspect of (5), the occurrence of traffic congestion can be accurately estimated based on the simple regression line of the detection result of the speed and the detection result of the inter-vehicle distance.

According to the aspect of (6), the occurrence of traffic congestion can be accurately estimated based on the simple regression line of the detection result of the speed and the detection result of the inter-vehicle distance or the standard deviation of the parameters of the simple regression line is displayed, in addition to the effect in (5).

EMBODIMENTS FOR CARRYING OUT THE INVENTION

Hereinafter, an embodiment of a congestion estimation device according to the present invention will be described with reference to the appended drawings.

Figure 1:
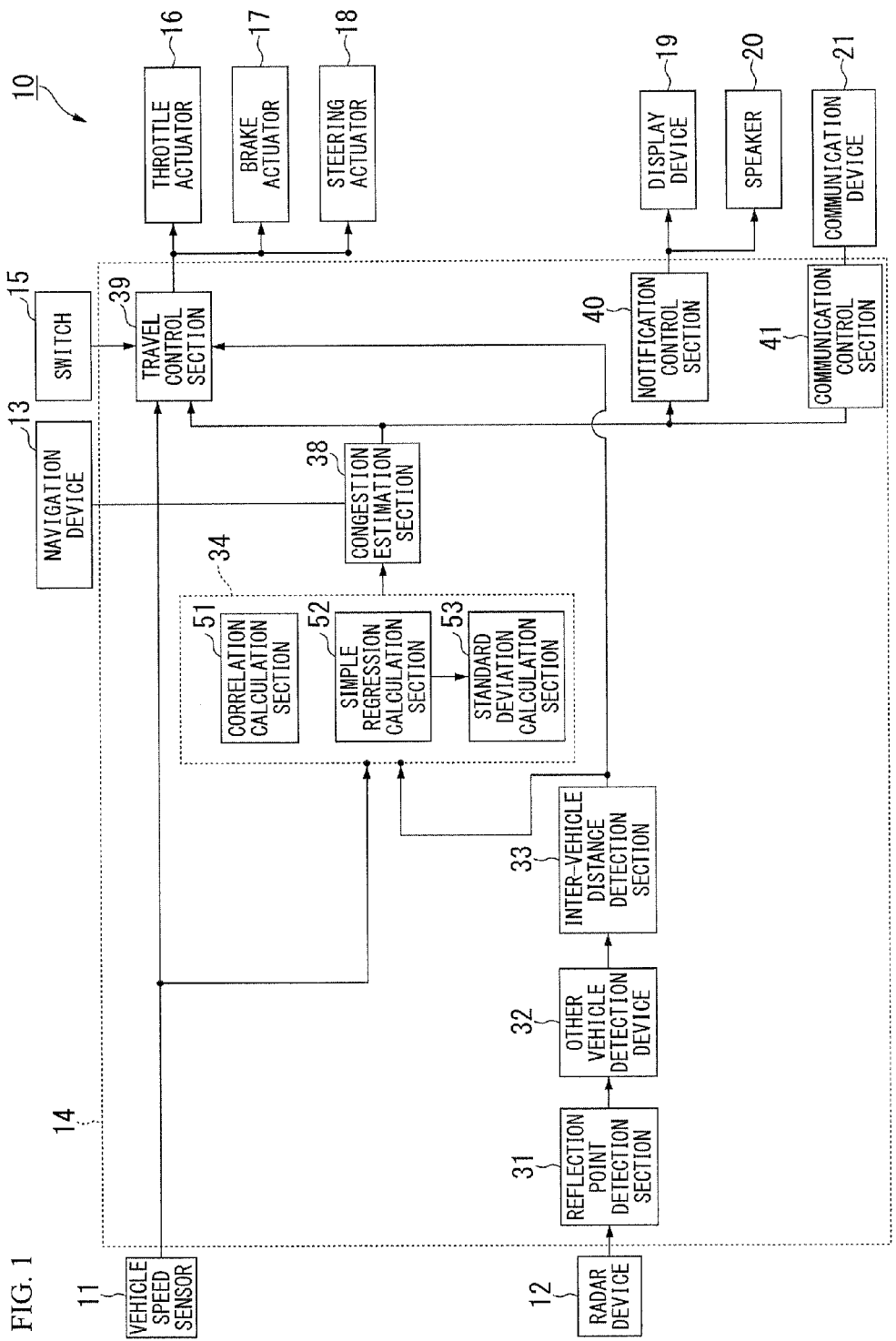
FIG. 1 is a configuration view of a traffic congestion estimation apparatus according to an embodiment of the present invention.

For example, as shown in FIG. 1, a congestion estimation device 10 according to the embodiment includes a vehicle speed sensor 11, a radar device 12, a navigation device 13, a processing device 14, a switch 15, a throttle actuator 16, a brake actuator 17, a steering actuator 18, a display device 19, a speaker 20 and a communication device 21.

The vehicle speed sensor 11 detects the speed of a host vehicle (vehicle speed) and outputs a signal of the detection result.

The radar device 12 divides a detection target region which is set to outside the host vehicle into a plurality of angle regions and transmits transmission signals of an infrared laser and electromagnetic waves such as millimeter waves so as to scan each angle region. Then, the radar device 12 receives the reflected signals generated in such a manner that each transmission signal is reflected by an object external to the host vehicle (for example, other vehicles, structures and the road surface). Then, the signals relating to the transmission signals and the reflected signals are output to the processing device 14.

For example, the radar device 12 divides a detection target region in a predetermined angle range from the host vehicle into a plurality of vertical angle regions of the vertical direction of the host vehicle and a plurality of horizontal angle regions of the horizontal direction of the host vehicle. Then, while the plurality of vertical angle regions are sequentially switched, for example, from above to below in the vertical direction, the radar device transmits electromagnetic waves to each of the plurality of vertical angle regions and while the plurality of horizontal angle regions are sequentially switched, for example, from left to right in the horizontal direction, the radar device transmits electromagnetic waves to each of the plurality of horizontal angle regions.

The navigation device 13 receives a positioning signal such as a GPS (Global Positioning System) signal to measure the position of the host vehicle by using, for example, satellites and calculates the current position of the host vehicle on the basis of the positioning signal.

In addition, for example, the navigation device 13 calculates the current position of the host vehicle by a calculation process of autonomous navigation based on the speed of the host vehicle (vehicle speed) and a yaw-rate detection signal output from the vehicle speed sensor 11 and a yaw-rate sensor (not shown).

In addition, the navigation device 13 includes map display data to display a map on the display device 19 and road coordinate data which is required for a map matching process on the basis of the current position of the host vehicle as map data. Furthermore, the navigation device 13 includes data required for processes such as a path search process or a path guide process, for example, data about each node, which is a point including the latitude and longitude of a predetermined position, such as an intersection or a junction, and road data including a link which is a line linking the respective nodes as map data. In addition, various kinds of information are added to the nodes and links.

Then, the navigation device 13 performs the map matching process on the basis of the information of the current position of the host vehicle obtained from the respective calculation processes of the positioning signal and autonomous navigation or any one of the calculation processes with respect to the road data to correct the result of the position detection.

In addition, the navigation device 13 performs a process such as a path search process or a path guide process of the host vehicle according to an input operation of an operator, outputs path information and various kinds of additional information to a destination on the display device 19 with the road data and outputs various kinds of voice messages from the speaker 20.

Then, the navigation device 13 can perform a process such as a path search process or a path guide process of the host vehicle based on a estimation result of occurrence of traffic congestion output from a congestion estimation section 38 which will be described later and a estimation result of the occurrence of estimated traffic congestion to other vehicle output from a communication control section 41 which will be described later, for example, so as to avoid traffic congestion.

The processing device 14 includes, for example, a reflection point detection section 31, other vehicle detection section 32, an inter-vehicle distance detection section 33, a calculation section 34, the congestion estimation section 38, a travel control section 39, a notification control section 40 and the communication control section 41.

Then, various kinds of signals relating to vehicle traveling control of the host vehicle output from the switch 15 are input to the processing device 14.

As the signals output from the switch 15, for example, there are a signal relating to the operation state of a brake pedal (not shown) by a driver, a signal relating to the operation state of an accelerator pedal (not shown) by a driver, a signal that instructs starting or stopping of performing autonomous traveling control which automatically controls the travel state of the host vehicle according to the input state of a driver, a signal that instructs increasing or decreasing the target vehicle speed in the autonomous traveling control and a signal that instructs increasing or decreasing the target inter-vehicle distance with respect to the inter-vehicle distance between the host vehicle and the other vehicle (for example, a preceding vehicle) in the autonomous traveling control (for example, following traveling control that automatically follows a preceding vehicle).

The reflection point detection section 31 detects a position of a reflection point of the reflected signal, for example, on the basis of the signal output from the radar device 12 to output the detection result.

The other vehicle detection section 32 detects at least one or more other vehicles present outside of the host vehicle, in accordance with the distance between adjacent reflection points and the distribution state of the plurality of reflection points, for example, on the basis of the detection result of the position of the reflection point output from the reflection point detection section 31 to output the detection result.

The inter-vehicle distance detection section 33 detects an inter-vehicle distance between the host vehicle and the other vehicle, for example, on the basis of the detection result of at least one or more other vehicles output from the other vehicle detection section 32 to output the detection result together with the number of detected other vehicles.

The calculation section 34 calculates a state quantity relating to the estimation of the occurrence of traffic congestion in front of the host vehicle in the traveling direction on the basis of the detection result of the speed of the host vehicle (vehicle speed) output from the vehicle speed sensor 11 and the detection result of the inter-vehicle distance between the host vehicle and the other vehicle output from the inter-vehicle distance detection section 33 to output the calculation result.

The calculation section 34 includes, for example, a correlation calculation section 51, a simple regression calculation section 52 and a standard deviation calculation section 53.

The correlation calculation section 51 calculates a correlation value (Pearson correlation value) such that data $(x_i, y_i)$ $(i=1, \ldots, n)$ as arbitrary numbers i and n is set as a combination of the inter-vehicle distance between the host vehicle and the other vehicle and the speed of the host vehicle at an appropriate time point to output the calculation result.

For example, the speed of the host vehicle at each time point is the detection result output from the vehicle speed sensor 11 at each time point (that is, instantaneous values), an average value of the detection results (that is, the average value of instantaneous values) output from the vehicle speed sensor 11 with predetermined time intervals (for example, among each time t1, . . . , t6 shown in FIGS. 2A and 2B), or the like.

In addition, the inter-vehicle distance at each time point is, for example, the instantaneous value or the average value of the instantaneous values with respect to a value such as the inter-vehicle distance between the host vehicle and a specific other vehicle (for example, a preceding vehicle) output from the inter-vehicle distance detection section 33, for example, the average value of the inter-vehicle distances between the host vehicle and a plurality of other vehicles output from the inter-vehicle distance detection section 33, for example, or the minimum value of the inter-vehicle distance between the host vehicle and the plurality of other vehicles output from the inter-vehicle distance detection section 33.

Figure 2A:
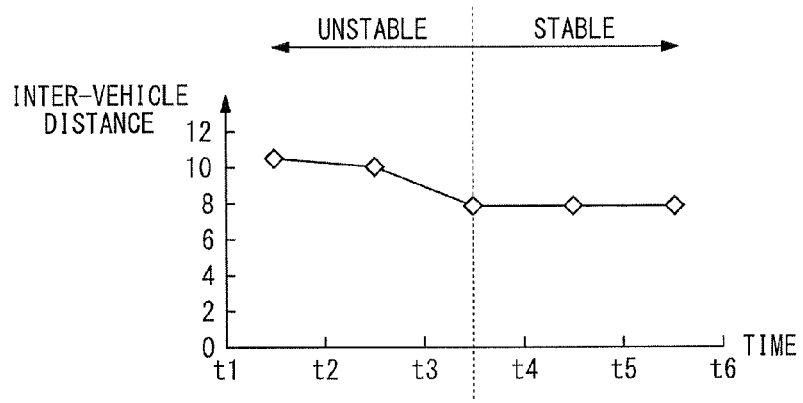
FIG. 2A is a graph showing an example of time variation of an inter-vehicle distance minimum value and time variation of a correlation value between speed and an inter-vehicle distance of a host vehicle according to the embodiment.
Figure 2B:
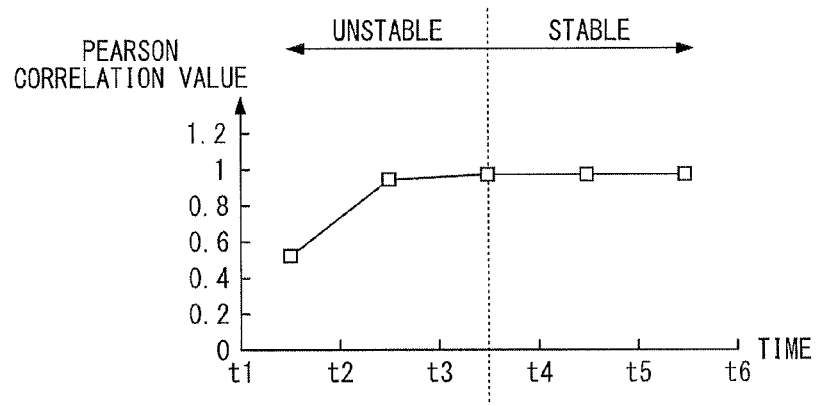
FIG. 2B is a graph showing an example of time variation of an inter-vehicle distance minimum value and time variation of a Pearson correlation value between speed and an inter-vehicle distance of the host vehicle according to the embodiment.

For example, specifically, the calculation result of the correlation value (Pearson correlation value) output from the correlation calculation section 51 relates to a formation process of a vehicle group by other vehicles and, for example, as shown in FIGS. 2A and 2B, a stable state which maintains a state in which the minimum value of the inter-vehicle distance (inter-vehicle distance minimum value) is small and the Pearson correlation value is large corresponds to a state in which a vehicle group is already formed and traffic congestion occurs.

In addition, as shown in FIGS. 2A and 2B, an unstable state which transitions from a state where the inter-vehicle distance minimum value is large and the Pearson correlation value is small to a state where the inter-vehicle distance minimum value is small and the Pearson correlation value is large corresponds to a state in which the formation of the vehicle group is promoted and a state in which there is a high possibility of traffic congestion occurring.

On the other hand, for example, the stable state which maintains a state where the minimum value of the inter-vehicle distance (inter-vehicle distance minimum value) is large and the Pearson correlation value is small, and the unstable state which transitions from a state where the inter-vehicle distance minimum value is small and the Pearson correlation value is large to a state where the inter-vehicle distance minimum value is large and the Pearson correlation value is small corresponds to a state in which the vehicle group is not formed or the formation of the vehicle group is suppressed and a state in which there is a low possibility or no possibility of traffic congestion occurring.

Figure 3:
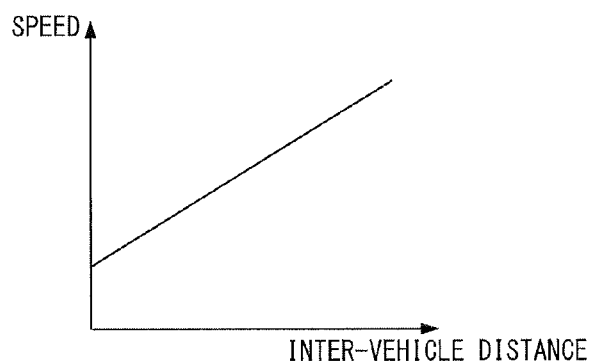
FIG. 3 is a graph showing an example of a simple regression line with respect to the speed and the inter-vehicle distance of the host vehicle according to the embodiment.

For example, the simple regression calculation section 52 calculates a simple regression line, for example, as shown in FIG. 3 such that the data $(x_i, y_i)$ $(i=1, \ldots, n)$ using the arbitrary numbers i and n is set as a combination of the inter-vehicle distance between the host vehicle and the other vehicle and the speed of the host vehicle at an appropriate time point and calculates the slope (that is, vehicle speed/inter-vehicle distance) and intercept (that is, vehicle speed when the inter-vehicle distance is zero) of the simple regression line to output the calculation result.

Figure 4A:
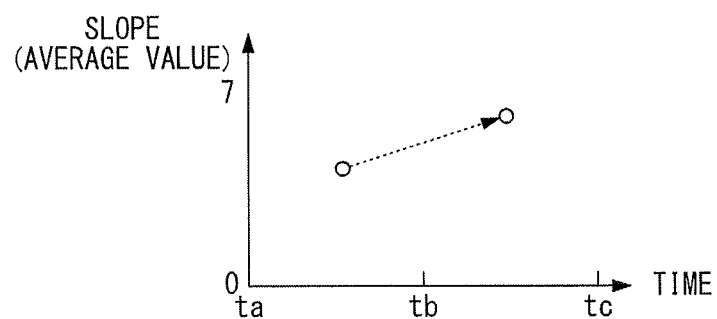
FIG. 4A is a graph showing an example of time variation of an average value of the slope of the simple regression line with respect to the speed and the inter-vehicle distance of the host vehicle according to the embodiment.
Figure 4B:
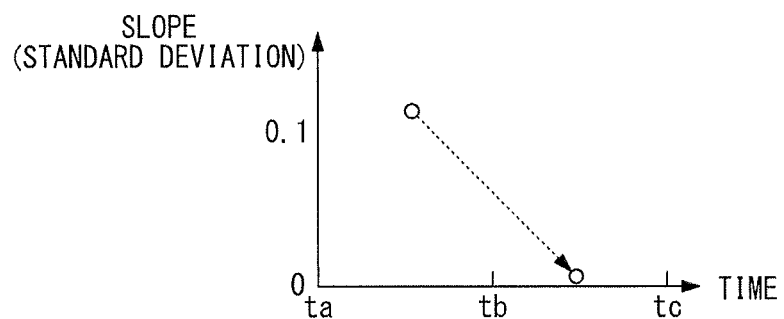
FIG. 4B is a graph showing an example of time variation of a standard deviation of the slope of the simple regression line with respect to the speed and the inter-vehicle distance of the host vehicle according to the embodiment.

For example, the speed of the host vehicle at each time point is the detection result (that is, instantaneous value) output from the vehicle speed sensor 11 at each time point, the average value of the detection results (that is, the average value of instantaneous values) with predetermined time intervals (for example, among the respective time points ta, . . . , tc shown in FIGS. 4A and 4B) output from the vehicle speed sensor 11, or the like.

In addition, the inter-vehicle distance at each time point is, for example, the instantaneous value or the average value of the instantaneous values with respect to a value such as the inter-vehicle distance between the host vehicle and a specific other vehicle (for example, a preceding vehicle) output from the inter-vehicle distance detection section 33, for example, the average value of the inter-vehicle distances among the host vehicle and the plurality of other vehicles output from the inter-vehicle distance detection section 33, for example, or the minimum value of the inter-vehicle distance among the host vehicle and the plurality of other vehicles output from the inter-vehicle distance detection section 33.

The standard deviation calculation section 53 calculates an average value and a standard deviation of the calculation results (that is, the instantaneous values) output from the simple regression calculation section 52, for example, with the predetermined time intervals on the basis of the calculation result of a parameter of the simple regression line (that is, the slope and the intercept) output from the simple regression calculation section 52 to output the calculation result.

For example, an average value and a standard deviation of the parameters of the simple regression line output from the standard deviation calculation section 53 specifically relates to whether the inter-vehicle distance between the host vehicle and the other vehicle is sufficiently long and, as shown in FIGS. 4A and 4B, a state in which time variation of the average value of the slope of the simple regression line has a tendency of increasing, or a state in which time variation of the standard deviation of the slope of the simple regression line has a tendency of decreasing corresponds to a state in which the inter-vehicle distance is sufficiently decreased and a state in which there is a high possibility of traffic congestion occurring.

On the other hand, for example, a state in which the time variation of the average value of the slope of the simple regression line has a tendency of decreasing, or a state in which the time variation of the standard deviation of the slope of the simple regression line has a tendency of increasing corresponds to a state in which the inter-vehicle distance is sufficiently increased and a state in which there is a low possibility or no possibility of traffic congestion occurring.

For example, the congestion estimation section 38 estimates the occurrence of traffic congestion in front of the host vehicle in the traveling direction to output the estimation result, in accordance with any one of the calculation result of the correlation value (Pearson correlation value) output from the correlation calculation section 51 and the calculation results of the average value and the standard deviation of the parameters of the simple regression line output from the standard deviation calculation section 53.

For example, as shown in FIG. 2B, the congestion estimation section 38 determines that the unstable state which transitions from a state in which the Pearson correlation value is small to a state in which the Pearson correlation value is large is a state in which there is a high possibility of traffic congestion occurring on the basis of the calculation result of the correlation value (Pearson correlation value) output from the correlation calculation section 51. On the other hand, for example, the congestion estimation section 38 determines that the unstable state which transitions from a state in which the Pearson correlation value is large to a state in which the Pearson correlation value is small is a state in which there is a low possibility or no possibility of traffic congestion occurring.

For example, as shown in FIG. 2B, the stable state which maintains a state in which the Pearson correlation value is large is determined as a state where the vehicle group is already formed and traffic congestion occurs. On the other hand, the stable state which maintains a state in which the Pearson correlation value is small is determined as a state in which the vehicle group is not formed and traffic congestion does not occur.

For example, as shown in FIGS. 4A and 4B, the congestion estimation section 38 determines that a state in which the time variation of the average value of the slope has a tendency of increasing, or a state in which the time variation of the standard deviation of the slope has a tendency of decreasing is a state in which there is a high possibility of traffic congestion occurring, on the basis of any one of the calculation results of the average value and the standard deviation of the parameters of the simple regression line output from the standard deviation calculation section 53. Meanwhile, for example, the congestion estimation section 38 determines that a state in which the time variation of the average value of the slope of the simple regression line has a tendency of decreasing, or a state in which the time variation of the standard deviation of the slope of the simple regression line has a tendency of increasing is a state in which the inter-vehicle distance is sufficiently increased and a state in which there is a low possibility or no possibility of traffic congestion occurring.

The congestion estimation section 38 outputs the estimation result to the navigation device 13, the travel control section 39 and the notification control section 40 when the estimation of the occurrence of traffic congestion is performed. Moreover, the position information such as the current position of the host vehicle and a predetermined region around the current position on the map data is obtained from the navigation device 13 and the estimation result and the position information are associated with each other to be stored and output to the communication control section 41.

In addition, when the congestion estimation section 38 directly transmits the estimation result by the communication device 21 or transmits the estimation result to a preceding vehicle of the host vehicle through an appropriate server apparatus (not shown), a relay station (not shown) and the like in the case of outputting the estimation result to the communication control section 41, a command to instruct change of the traveling state of the preceding vehicle to a traveling state where a following vehicle of the preceding vehicle is not likely to generate traffic congestion may be added.

The travel control section 39 controls the traveling of the host vehicle by controlling, for example, the throttle actuator 16, the brake actuator 17 and the steering actuator 18 based on the estimation result of the occurrence of traffic congestion output from the congestion estimation section 38, the estimation result of the occurrence of the estimated traffic congestion to the other vehicle output from the communication control section 41 which will be described later, various kinds of signals output from the switch 15, the detection result of the speed of the host vehicle (vehicle speed) output from the vehicle speed sensor 11, and the detection result of the inter-vehicle distance output from the inter-vehicle distance detection section 37.

For example, the travel control section 39 starts or stops performing the autonomous traveling control according to the signal output from the switch 15 or sets or changes the target vehicle speed and target inter-vehicle distance in the autonomous traveling control.

In addition, for example, when it is determined that there is a high possibility of traffic congestion occurring in front of the host vehicle in the traveling direction in the estimation result output from the congestion estimation section 38, the travel control section 39 sets the target vehicle speed and the target inter-vehicle distance required for the host vehicle to avoid traffic congestion. Then, the autonomous traveling control to maintain the target vehicle speed and the target inter-vehicle distance (for example, constant speed traveling control which makes the actual vehicle speed equal to the target vehicle speed and inter-vehicle distance control which makes the actual inter-vehicle distance equal to the target inter-vehicle distance (for example, following traveling control) with respect to the other vehicle (for example, a preceding vehicle), is performed.

In addition, for example, when it is determined that there is a high possibility of traffic congestion occurring in front of the host vehicle in the traveling direction in the estimation result of the occurrence of the estimated traffic congestion to the other vehicle (for example, a preceding vehicle or a following vehicle) output from the communication control section 41 which will be described later, the travel control section 39 sets the target vehicle speed and the target inter-vehicle distance required for the host vehicle to avoid traffic congestion and further, for the following vehicle of the host vehicle to be unlikely to generate traffic congestion or changes the traveling state of the host vehicle.

The notification control section 40 controls various kinds of notification operations by controlling, for example, the display device 19 and the speaker 20 on the basis of the estimation result of traffic congestion output from the congestion estimation section 38 and the estimation result of the occurrence of the estimated traffic congestion to the other vehicle (for example, a preceding vehicle or a following vehicle) output from the communication control section 41 which will be described later.

For example, the notification control section 40 notifies the driver of presence of the possibility of traffic congestion occurring in front of the host vehicle in the traveling direction (or traffic congestion is likely to occur or traffic congestion is not likely to occur), information on the position where the occurrence of traffic congestion is estimated, driving operation instructions which are required for the host vehicle to avoid traffic congestion and further, for the following vehicle of the host vehicle to be unlikely to generate traffic congestion and the like.

For example, the notification control section 40 notifies the calculation result of the correlation value (Pearson correlation value) output from the correlation calculation section 51 or information relating to the calculation result of the correlation value.

In addition, the information relating to the calculation result of the correlation value (Pearson correlation value) is, for example, a estimation result of the occurrence of traffic congestion in front of the host vehicle in the traveling direction output from the congestion estimation section 38 on the basis of the calculation result of the correlation value.

Moreover, the notification control section 40 notifies, for example, the calculation result of the parameter of the simple regression line output from the standard deviation calculation section 53 (for example, the instantaneous value, the average value and the standard deviation) or information relating to the calculation result of the parameter of the simple regression line.

In addition, for example, the information relating to the calculation result of the parameter of the simple regression line is, for example, a estimation result of the occurrence of traffic congestion in front of the host vehicle in the traveling direction output from the congestion estimation section 38 on the basis of the parameter of the simple regression line.

Then, the notification control section 40 notifies the driver of a high possibility of traffic congestion occurring in front of the host vehicle in the traveling direction, traffic congestion that has already occurred, a low possibility of traffic congestion occurring, and traffic congestion not occurring, for example, by appropriately controlling the display colors and display luminance of an image on the display device 19, and appropriately controlling voice output from the speaker 20 in accordance with the estimation result output from the congestion estimation section 38.

The communication control section 41 communicates with the other vehicle or an appropriate server apparatus (not shown) and a relay station (not shown), for example, through radio communication by the communication device 21, and makes the estimation result of the occurrence of traffic congestion output from the congestion estimation section 38 and the position information associated with each other to be transmitted or receives the information in which the estimation result of the occurrence of the estimated traffic congestion to the other vehicle and the position information are associated with each other. Then, the associated information of the estimation result of the occurrence of traffic congestion obtained from the outside and the position information is output to the navigation device 13, the travel control section 39 and the notification control section 40.

The congestion estimation device 10 according to the embodiment is provided with the above configuration and the operations of the congestion estimation device 10, that is, a process of the method of traffic congestion estimation will be described below.

Figure 5:
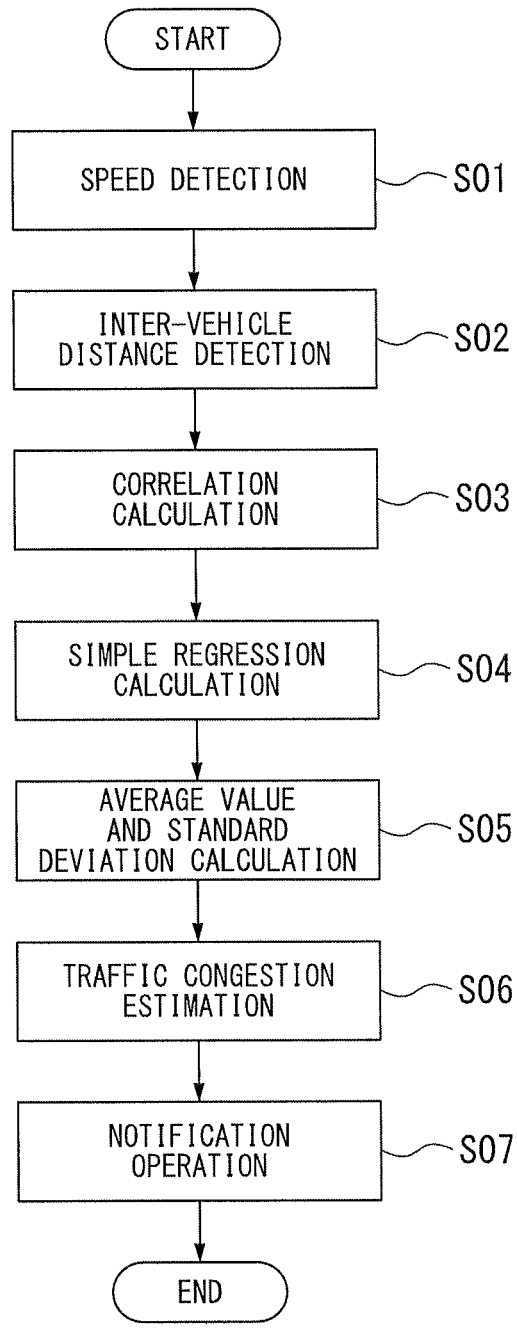
FIG. 5 is a flowchart showing a process of a congestion estimation method according to the embodiment.

First, for example, the speed of the host vehicle (vehicle speed) is detected by the vehicle speed sensor 11 in Step S01 shown in FIG. 5.

Next, at least one or more other vehicles present outside of the host vehicle are detected on the basis of the signal output from the radar device 12 and the inter-vehicle distance between the host vehicle and the other vehicle is detected in Step S02.

Next, the data $(x_i, y_i)$ (i=1, ..., n) using the arbitrary numbers i and n is set as a combination of the inter-vehicle distance between the host vehicle and the other vehicle and the speed of the host vehicle at an appropriate time point to calculate the correlation value (Pearson correlation value) in Step S03.

Next, the data $(x_i, y_i)$ (i=1, ..., n) using the arbitrary numbers i and n is set as the combination of the inter-vehicle distance between the host vehicle and the other vehicle and the speed of the host vehicle at an appropriate time point and calculates the slope (that is, vehicle speed/inter-vehicle distance) and the intercept (that is, the vehicle speed when the inter-vehicle distance is zero) of the simple regression line as shown in FIG. 3 to output the calculation result in Step S04.

Next, for example, the average value and the standard deviation of calculation results of the parameters in the simple regression line (that is, instantaneous values) with predetermined time intervals are calculated on the basis of the calculation result of the parameter (that is, the slope and the intercept) of the simple regression line in Step S05.

Next, the occurrence of traffic congestion in front of the host vehicle in the traveling direction is estimated in accordance with any one of the calculation result of the correlation value (Pearson correlation value) and the calculation results of the average value and the standard deviation of the parameters of the simple regression line in Step S06.

Next, the calculation result of the correlation value (Pearson correlation value) or information relating to the calculation result of the correlation value is notified or the calculation result of the parameter of the simple regression line (for example, the instantaneous value, the average value and the standard deviation) or information relating to the calculation result of the parameter of the simple regression line is notified and the process proceeds to End in Step S07.

As described above, it is possible to obtain a calculation result having a high relevance to the formation process of the vehicle group by calculating the correlation value (Pearson correlation value) or the simple regression line with respect to the combination of the inter-vehicle distance between the host vehicle and the other vehicle and the speed of the host vehicle in the congestion estimation device 10 according to the embodiment of the present invention. Therefore, the occurrence of traffic congestion can be easily estimated at an early stage and with accuracy based on the calculation results.

Furthermore, it is possible for a driver to accurately recognize the presence of the possibility of traffic congestion occurring (or traffic congestion is likely to occur, traffic congestion is not likely to occur or the like) by notifying the calculation result of the correlation value (Pearson correlation value) or the information relating to the calculation result of the correlation value and the calculation result of the parameter of the simple regression line (for example, the instantaneous value, the average value and the standard deviation) or the information relating to the calculation result of the parameter of the simple regression line.

INDUSTRIAL APPLICABILITY

It is possible to provide a congestion estimation device capable of improving the accuracy of traffic congestion estimation.

DESCRIPTION OF REFERENCE SYMBOLS 10 congestion estimation device
11 vehicle speed sensor (speed detection unit)
12 radar device
19 display device (display unit)
20 speaker
21 communication device
31 reflection point detection section
32 other vehicle detection device
33 inter-vehicle distance detection section (inter-vehicle distance detection unit)
34 calculation section
38 congestion estimation section (congestion estimation unit)
39 travel control section
40 notification control section (display unit)
41 communication control section
51 correlation calculation section (correlation calculation unit)
52 simple regression calculation section (simple regression line calculation unit)
53 standard deviation calculation section (standard deviation calculation unit)

The invention claimed is:

1. A congestion estimation device, comprising:
a speed detection unit comprising a vehicle speed sensor for detecting a speed of a host vehicle and outputting a speed detection result;
an inter-vehicle distance detection unit comprising a radar device for detecting an inter-vehicle distance between the host vehicle and another vehicle and outputting an inter-vehicle distance detection result;
a simple regression line calculation unit comprising processors for calculating a simple regression line based on the speed detection result and the inter-vehicle distance detection result and outputting a calculation result;
a standard deviation calculation unit comprising processors for calculating a standard deviation of slope of the simple regression line and outputting a standard deviation calculation result; and
a congestion estimation unit comprising processors for: estimating an occurrence of traffic congestion based on the standard deviation calculation result, and determining that there is a high possibility of traffic congestion occurring when a time variation of the standard deviation of the slope of the simple regression line has a tendency of decreasing.

2. The congestion estimation device according to claim 1, further comprising:
a display unit configured to display at least one of the standard deviation calculation result and the determination result of the congestion estimation.

3. A congestion estimation device, comprising:
a speed detection unit comprising a vehicle speed sensor for detecting a speed of a host vehicle and outputting a speed detection result;
an inter-vehicle distance detection unit comprising a radar device for detecting an inter-vehicle distance between the host vehicle and another vehicle and outputting an inter-vehicle distance detection result;
a simple regression line calculation unit comprising processors for calculating a simple regression line based on the speed detection result and the inter-vehicle distance detection result and outputting a calculation result;
an average value calculation unit comprising processors for calculating an average value of slope of the simple regression line and outputting an average value calculation result; and
a congestion estimation unit comprising processors for: estimating an occurrence of traffic congestion based on the average value calculation result, and determining that there is a high possibility of traffic congestion occurring when a time variation of the average value of the slope of the simple regression line has a tendency of increasing.

4. The congestion estimation device according to claim 3, further comprising:
a display unit configured to display at least one of the average value calculation result and the determination result of the congestion estimation.

5. A congestion estimation device, comprising:
a speed detection unit comprising a vehicle speed sensor for detecting a speed of a host vehicle and outputting a speed detection result;
an inter-vehicle distance detection unit comprising a radar device for detecting an inter-vehicle distance between the host vehicle and another vehicle and outputting an inter-vehicle distance detection result;
a correlation calculation unit comprising processors for calculating a correlation based on the speed detection result and the inter-vehicle distance detection result and outputting a calculation result; and
a congestion estimation unit comprising processors for: estimating an occurrence of traffic congestion based on the calculation result of the correlation, and determining that there is a high possibility of traffic congestion occurring when a transition from a first state where an inter-vehicle distance minimum value is large and the correlation is small to a second state where the inter-vehicle distance minimum value is small and the correlation is large occurs.

6. The congestion estimation device according to claim 5, further comprising:
a display unit configured to display at least one of the calculation result of the correlation and the determination result of the congestion estimation.

* * * * *